Sept. 1, 1931.  T. RAY ET AL  1,821,190

SCREEN BOX

Filed Dec. 19, 1927  3 Sheets-Sheet 1

Sept. 1, 1931.        T. RAY ET AL        1,821,190
SCREEN BOX
Filed Dec. 19, 1927        3 Sheets-Sheet 2

Witness:
William G. Kilroy

Inventors
Joshua R. Ray
Thomas Ray

Sept. 1, 1931.  T. RAY ET AL  1,821,190
SCREEN BOX
Filed Dec. 19, 1927  3 Sheets-Sheet 3

Witness:
William P. Kilroy

Inventors
Joshua R. Ray
Thomas Ray
Hill & Hill Attys

Patented Sept. 1, 1931

1,821,190

UNITED STATES PATENT OFFICE

THOMAS RAY AND JOSHUA R. RAY, OF MANISTEE, MICHIGAN

SCREEN BOX

Application filed December 19, 1927. Serial No. 241,051.

This invention pertains to the general class of devices for the purpose of separating solids from liquids and particularly to a screening device to be placed in a pipe line.

An object of applicants' invention is the production of a screening device for the purpose of screening solids from liquids and particularly scale and other foreign matter from the liquid coming from a vacuum pan or similar device.

A further object of applicants' invention is the production of a screen box that may be readily cleaned.

A further object of applicants' invention is the production of a screen box that may be readily flushed in the event that the solid matter collects upon the screening member.

A further object of applicants' invention is the production of a novel screening member.

A further object of applicants' invention is the production of a screen box of compact arrangement of parts, highly efficient, durable, positive in operation, economical and of low cost.

Applicants' device is particularly adapted for use in the leg pipes of vacuum pans or evaporators. Scale is formed due to the evaporation of liquid. This scale eventually breaks loose and passes out of the evaporator to the leg pipe and is of a destructive nature particularly to pumps, valves, etc. Furthermore, the liquid supplied to the evaporators often contains considerable solid foreign matter such as bolts, screws, pieces of wood and similar substances. This screen box is particularly designed to separate such scale and other foreign matter from the liquid. Screen boxes of this general class often become clogged due to the accumulation of scale and other foreign matter in the screen box, on the screening member, and particularly in the apertures of the screening member. A considerable portion of this solid matter collecting in the screen box and on and in the screening member is of a soluble nature. In applicants' novel device, a novel screening member is provided which will not become readily clogged. Means are provided for dissolving soluble substances and removing same from above and below the screening member. Means are also provded for readily removing all insoluble solid matter.

Many other objects and advantages of the construction herein shown and described will be obvious to those skilled in the art from the disclosure herein given.

To this end our invention consists in the novel construction, arrangement and combination of parts herein shown and described, and more particularly pointed out in the claims.

In the drawings, wherein like reference characters indicate like or corresponding parts:

Figure 1:
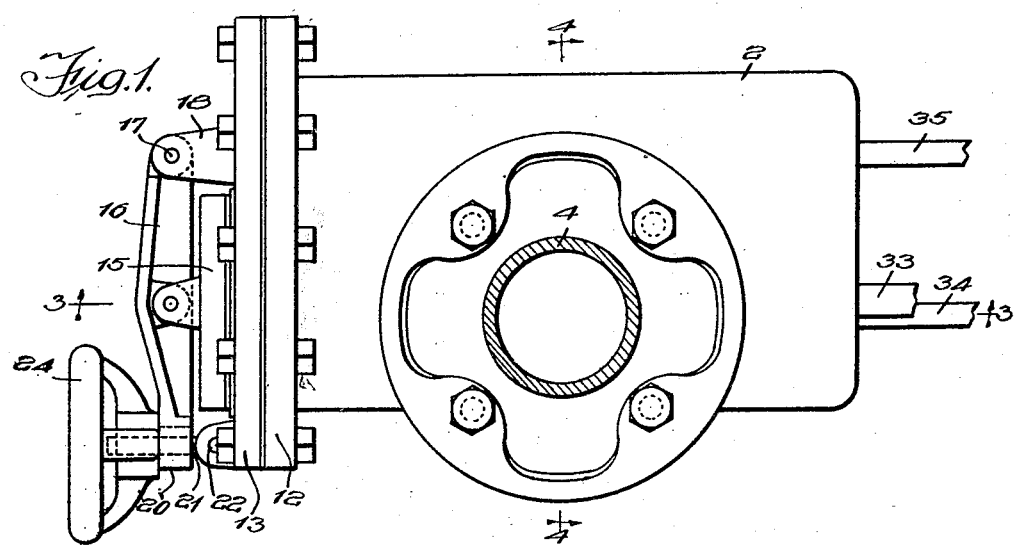
Fig. 1 is a top plan view of the screen box.
Figure 2:
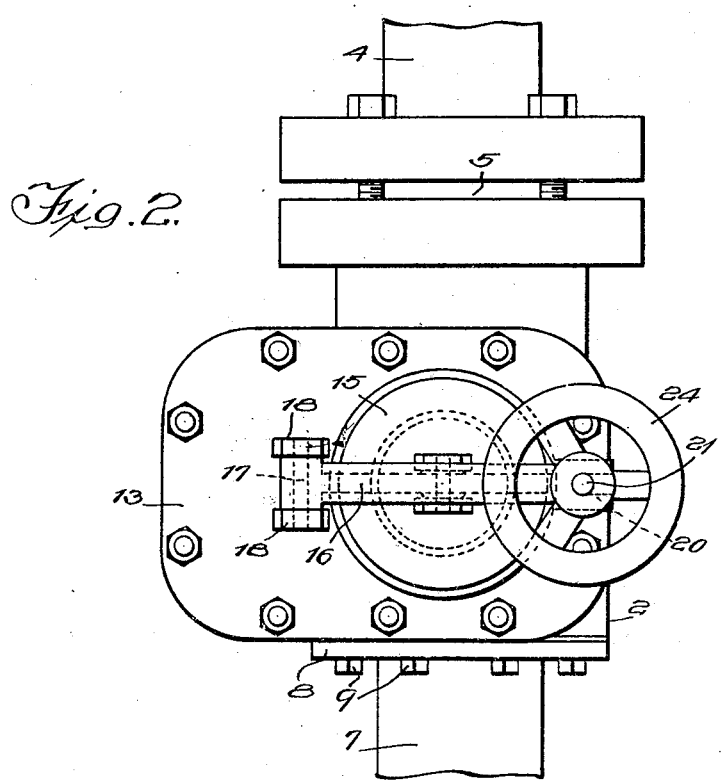
Fig. 2 is an end elevation of the same showing the manhole cover and the hand wheel for holding the same in closed position.
Figure 3:
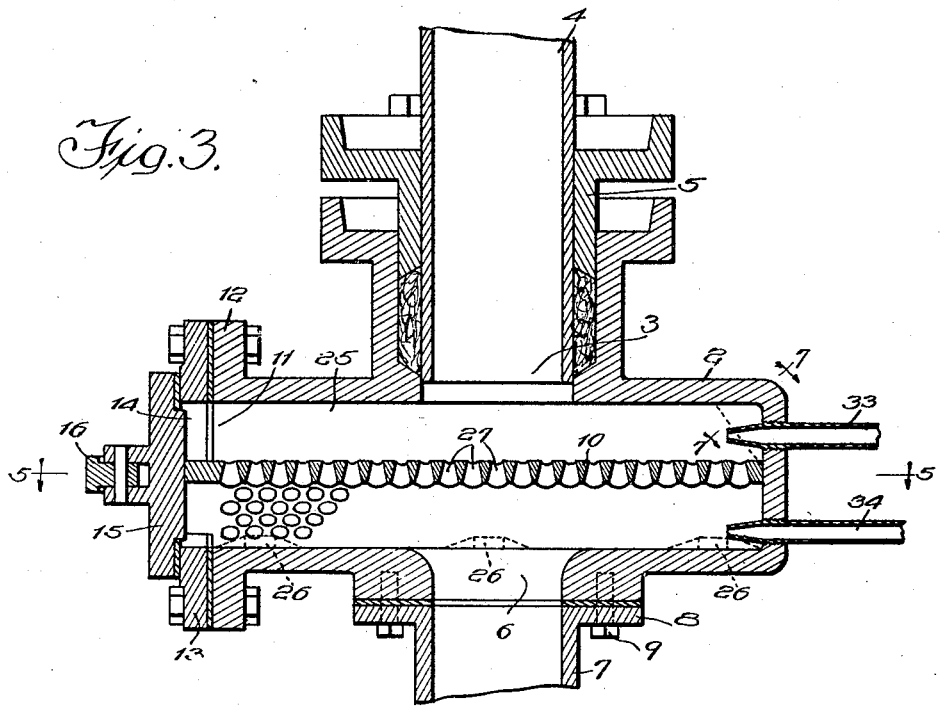
Fig. 3 is a sectional elevation taken on line 3—3 of Fig. 1.
Figure 4:
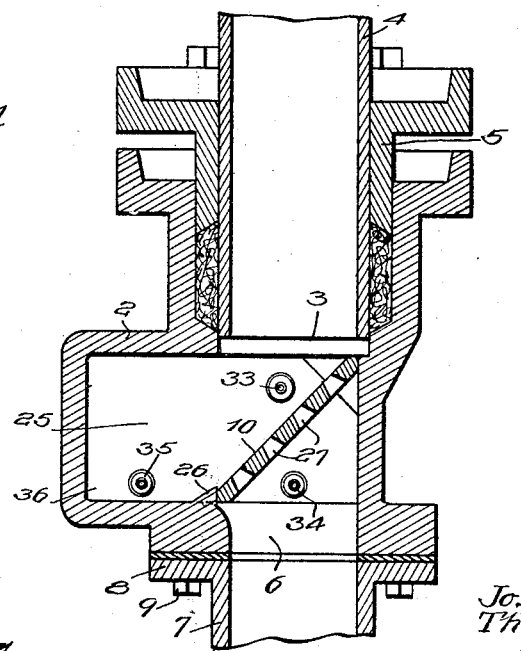
Fig. 4 is a sectional elevation taken on line 4—4 of Fig. 1.
Figure 5:
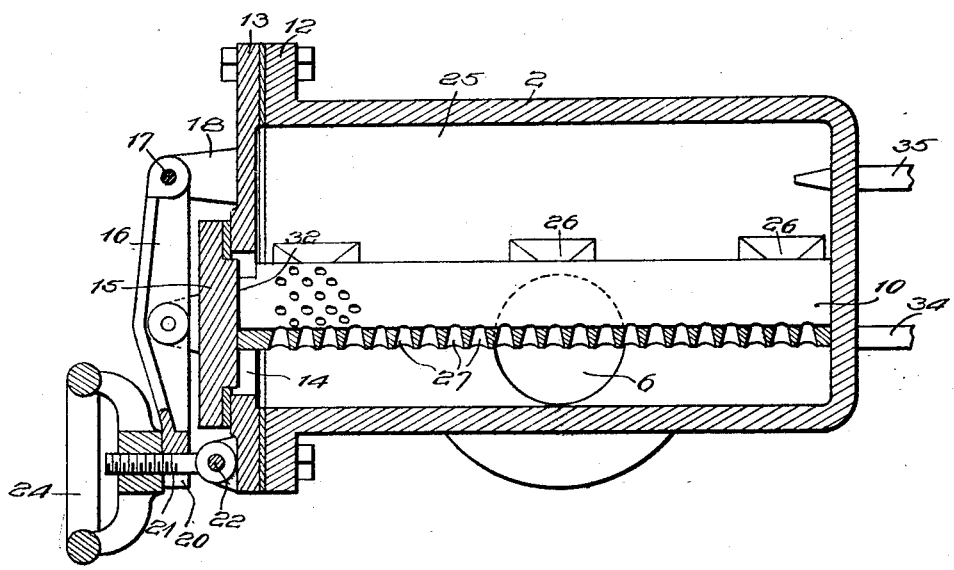
Fig. 5 is a sectional plan view taken on line 5—5 of Fig. 3.
Figure 6:
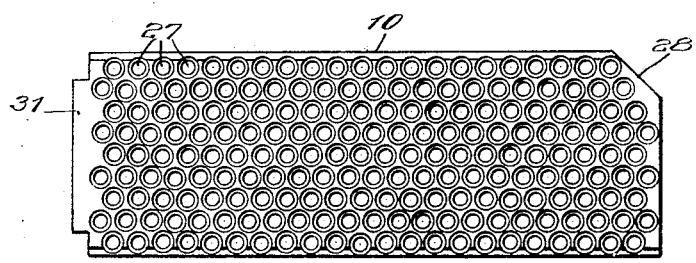
Fig. 6 is a detail of the screening member.
Figure 7:
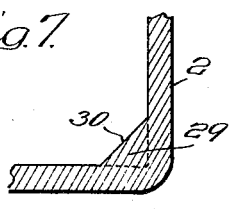
Fig. 7 is a fragmentary section taken on line 7—7 of Fig. 3.

Referring now to the drawings, 1 is a screen box in which 2 is a hollow body casing with preferably elongated and rectangular cross section. Body casing 2 has an inlet 3 with pipe 4 leading thereto. Pipe 4 is secured to casing 2 by means of stuffing box 5. Casing 2 has a suitable outlet 6 which leads to pipe 7. Pipe 7 is connected to casing 2 by any suitable means as by flange 8 and cap screws 9. As shown in the drawings, inlet 3 and outlet 6 are in alignment and have such positions in the preferred embodiment. However, the inlet 3 and outlet 6 may have any position relative to casing 2 as long as they are on the opposite sides of the screening member 10. One end of casing 2 is open as at 11 and is flanged as at 12. To the flange 12 is secured a cover plate 13 with a manhole 14 therein. Manhole 14 has a manhole cover 15 closing same. Manhole cover 15 is pivotally supported on a bar 16. One end 17 of bar 16 is pivoted to plate 13 by means of lugs 18 on the plate 13. The other end 20 of bar 16 is forked and receives rod 21 therebetween. Rod 21 is pivoted to plate 13 at 22 and has its other end threaded to receive a hand wheel 24. Screen member 10 is preferably supported diagonally in chamber 25 of casing 2 and held in position by suitable lugs 26. Apertures 27 in the screen member 10 are preferably tapered. The small end of the aperture faces toward the inlet and the large end faces toward the outlet of the casing. It is thus readily seen that any foreign matter which is sufficiently fine to pass through the narrow end of an aperture 27 will readily pass all the way through the aperture due to the tapering contour thereof. In order that screening member 10 will always be assembled in the screen box with the apertures in correct relation with respect to the inlet and outlet and in order that the screening member will always be replaced after cleaning in its correct position, one corner 28 of screening member 10 is cut away. One inner corner of casing 2 is filled as shown at 29 presenting a plane 30 diagonal across the corner. Cut-away portion 28 abuts plane 30, thus, allowing the screening member 10 to pass all the way into the casing 2. It is readily seen that screening member 10 can have but one position with respect to the casing 2. That portion of screening member 10 adjacent the manhole cover has a reduced portion 31 which extends into the manhole and abuts the inner face 32 of manhole cover 15, making a tight connection therewith. All other edges of the screening member 10 engage an inner wall of the casing 2, thus preventing any liquid from flowing around the edges of the screening member 10. In order to dissolve the soluble matter deposited upon the screening member, a jet 33 is provided which is located directly above the screening member. Jet 33 not only redissolves soluble matter but also washes insoluble matter from the screening member, causing same to settle to the bottom end of the screening member. Jet 34 is located below the screening member for the purpose of removing any accumulation of solids, causing same to flow out through the outlet 6. Jet 35 is provided for the purpose of redissolving any soluble matter settling into the extension 36 of chamber 25.

The operation of the device is as follows: The liquid together with any solid matter therein enters the screen box through inlet 3. The liquid passes on through the screening member 10 and solid matter of any considerable size is held back by the screening member. Any solid matter sufficiently fine to enter the upper ends of apertures 27 will pass on through the screen by virtue of the taper in the apertures. Soluble matter is dissolved by the operation of jets 33, 34 and 35. As the screen box becomes filled with insoluble solid matter, same is removed.

Having thus described our invention, it is obvious that various immaterial modifications may be made in the same without departing from the spirit of our invention; hence we do not wish to be understood as limiting ourselves to the exact form, construction, arrangement and combination of parts herein shown and described, or uses mentioned.

What we claim as new and desire to secure by Letters Patent is:

1. In a screen box of the kind described, a removable screening member therefor, means within said screen box comprising a closed corner in said screen box, and a cutaway corner on said screening member for causing said screening member to assume a predetermined position when placed in said screen box.

2. In a screen box of the kind described, a removable screening member therefor, means within said screen box comprising a closed corner in said screen box, and a cutaway corner on said screening member for causing said screening member to assume a predetermined position when placed in said screen box, said screening member having a plurality of apertures therein, said apertures expanding in the direction of the flow through said screening member.

3. In a screen box of the kind described, a removable inclined screening member therefor, said screening member having an eccentrically formed portion, and means within said box cooperating with said eccentrically formed portion of said screening member for causing said screening member to assume a predetermined position when placed and replaced in said screen box, said screening member having a plurality of apertures therein, said apertures expanding in the direction of the flow through said screening member.

4. In a screen box of the kind described, a removable screening member therefor, said screening member having unsymmetrical opposite edges with respect to both its longitudinal and transverse axes, and means within said screen box for seating said screening member so that said screening member will be caused to assume a predetermined position when placed and replaced in said screen box, said screening member having a plurality of apertures therein, said apertures expanding in the direction of the flow through said screening member.

5. In a screen box of the kind described, a removable inclined screening member therefor, said screening member having an eccentrically formed edge, and means within said box cooperating with said edge for causing said screening member to assume a predetermined position when placed and replaced in said screen box.

In testimony whereof, I have hereunto signed my name.

JOSHUA R. RAY.

In testimony whereof, I have hereunto signed my name.

THOMAS RAY.